June 17, 1930.　　　　C. G. OLSON　　　　1,763,983
HOB
Filed March 25, 1927　　2 Sheets-Sheet 1

INVENTOR
CARL G. OLSON
By Cheever & Cox
ATTYS.

June 17, 1930. C. G. OLSON 1,763,983
HOB
Filed March 25, 1927 2 Sheets-Sheet 2
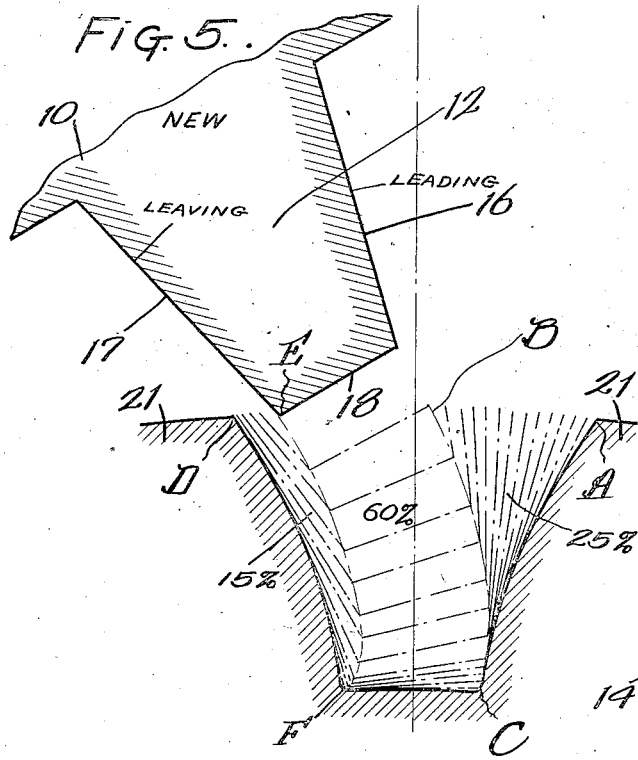
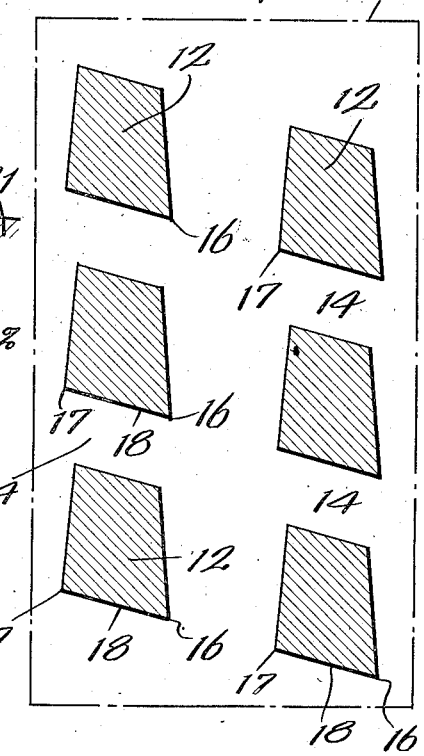
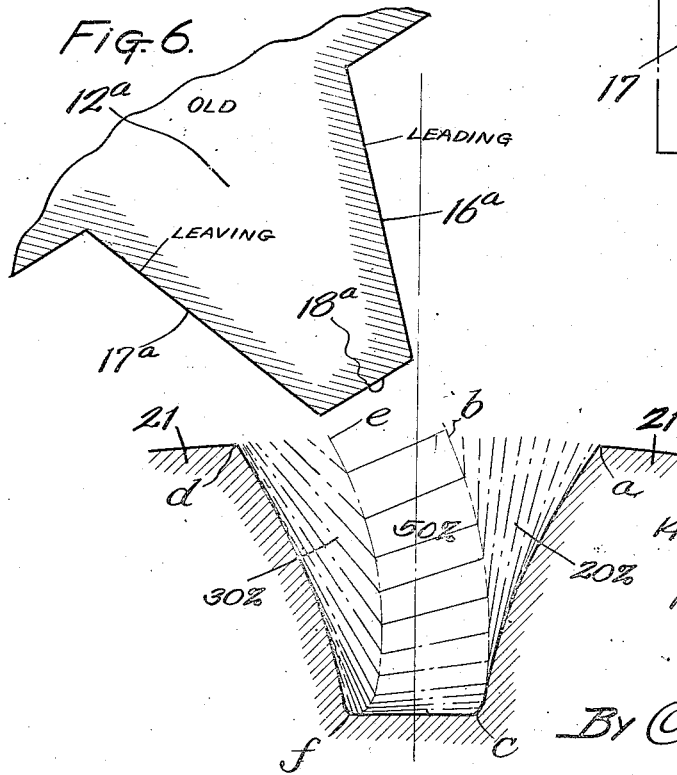
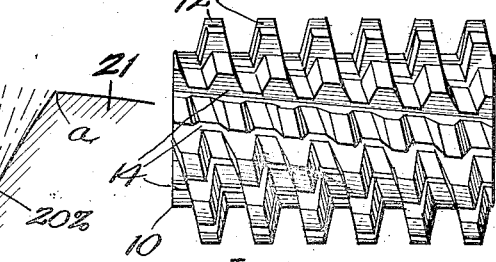
INVENTOR
CARL G. OLSON
By Cheever & Cox
ATTY'S Patented June 17, 1930

1,763,983

UNITED STATES PATENT OFFICE

CARL G. OLSON, OF CHICAGO, ILLINOIS, ASSIGNOR TO ILLINOIS TOOL WORKS, OF CHICAGO, ILLINOIS, A CORPORATION OF ILLINOIS

HOB

Application filed March 25, 1927. Serial No. 178,248.

This invention relates to hobs for cutting spur gears and the like, and the object primarily is to obtain a tool of greater capacity for work than those heretofore produced. This hob is adapted to remove stock more easily than the ordinary hob, and is therefore particularly adapted for roughing operations in large work.

I have found that a hob cuts more efficiently when we increase the sharpness of one of the cutting edges (even at the expense of rendering the other edge more obtuse) and then so configurate the hob teeth as to cause that sharper edge to do the major portion of the cutting. The sharpness of the cutting edge can be increased by running the flutes or gashes obliquely to the thread of the hob; for example, in my illustrated form of hob, I run the gashes helically and with the same hand lead as the thread of the hob. As part of my discovery, I have found that the amount of cutting imposed on one edge or the other of the hob teeth may be controlled by varying the steepness of the slope of the sides of the teeth. By increasing the steepness of the sides of the teeth, the greater will be the amount of metal removed by the leading side of the teeth and the less will be removed by the leaving side. I have coordinated these facts and increase the sharpness of one of the cutting edges of the hob teeth and then so slope the sides of the teeth as to call upon that sharper side to do a greater amount of cutting than heretofore. This increases the efficiency of the hob.

In the drawings, I have shown a right hand hob, i. e., a hob whose thread is a helix having a right hand lead, and have run the flutes in a right hand helix or spiral (but of course with a longer lead), which increases the sharpness of the cutting edge at the leading side of the hob tooth and have made the slope of the sides of the teeth steeper, which increases the amount of metal which the leading cutting edge will be called upon to and will remove from the gear blank.

The ordinary hob usually generates from the pitch circle of the gear to be cut. If the hob teeth have steeper sides than ordinary, they will generate from a circle of smaller diameter; that is, the hob tooth at the center of the cutting zone (considered axially along the hob) will be tangent to the gear tooth lower down on that gear tooth and the generating circle will be of smaller diameter than the pitch circle of the gear. The result is that my new hob has a shorter helical lead than the ordinary hob.

In hobbing, as well as many other metal cutting operations, cutting will be facilitated by so arranging the cutting edge that it will be oblique to its line of movement. This causes the edge to take a shearing cut and the obliquity of the cutting edge to its path of movement is sometimes referred to as "hook". I have contrived to take advantage of this principle in conjunction with the others herein explained, and in its developed form, my invention contemplates these improvements combined with the others. In the hob illustrated, both the side cutting edge and the top cutting edge of the hob teeth take shearing cuts. In the illustrated form, I increase the acuteness at the top cutting edge of the teeth by undercutting them, by which I mean so forming the gashes that the front face of a tooth will not be radial but at a slight angle, the lower portion of the tooth being slightly behind a radial plane dropped from the top of the tooth at the cutting edge thereof. This undercutting also imparts a hook to the leading cutting edge of the teeth.

To restate the matter briefly, as applied to the specific form of hob illustrated, I increase the sharpness of the leading side of the hob teeth at the expense of rendering the leaving side more obtuse, and contrive to lessen the amount of work or volume of cutting which the leaving side of the hob teeth will be called upon to perform and allot the decrement to the sharper, that is, the more acute edges; and this latter is accomplished by modifying the shape and relative positions of the hob teeth, that is, making the sides steeper than usual, which among other things, shortens the helical lead or the pitch of the hob. In conjunction with this, in the more developed form of hob, I inject the advantages resulting from cutting with a shearing action, and from increasing the sharpness at the top cutting edge of the teeth.

This will be understood from the following description taken in connection with the accompanying drawings in which—

Figure 5 is a diagram showing an outline or profile of a tooth of my hob and the manner in which it generates the gear teeth.

Figure 6 is a diagram analogous to Figure 5 showing an outline of an ordinary hob tooth and the manner in which it generates gear teeth of substantially the same size and shape as in Figure 3.

Figure 7 is a sectional view on the curved line 7—7 Figure 1, the scale, however, being enlarged.

Figure 8 is similar to Figure 2 on a decreased scale but showing a double thread hub instead of one having a single thread.

Like numerals denote like parts throughout the several views.

Figure 1:
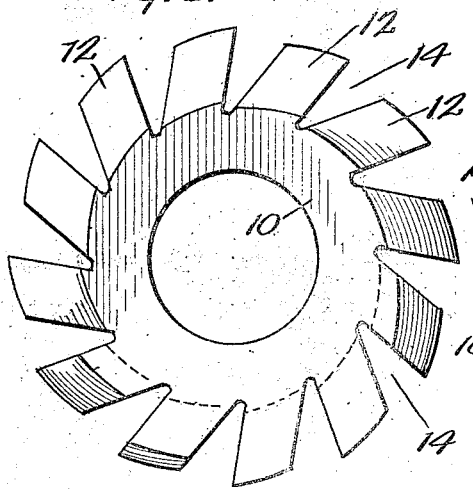
Figure 1 is an end view of a hob embodied in my invention.
Figure 2:
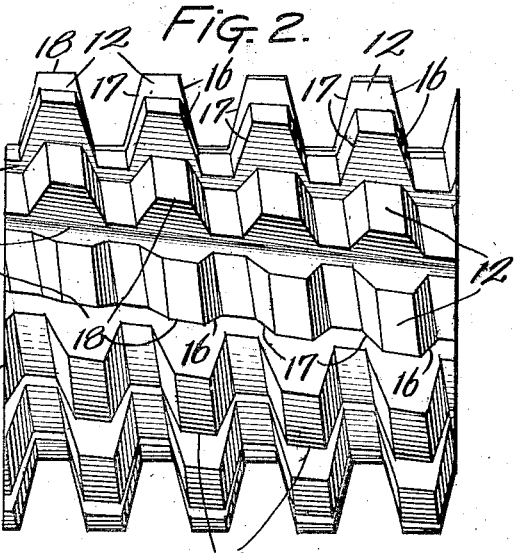
Figure 2 is a side view thereof.

To consider first the gashing and undercutting, reference should be had to Figures 1, 2 and 7. The hob has a body 10 with teeth 12 arranged helically in accordance with the general principles of a hob. In Figure 2 I have shown a single thread hob, although the same principles apply to a double thread hob as shown in Figure 8. The drawings illustrate right hand hobs, that is, one in which the helix progresses from the right end to the left end when the hob is viewed from the side where the cutting edges face downward. The gashes 14, while extending approximately transversely of the thread helix of the hub, extend helically and in a right-hand direction. The result is that the teeth are rendered more acute at the leading edge 16 (see especially Figure 7) with a corresponding decrease in the acuteness of the leaving edge 17. In fact the leaving edge becomes an obtuse angle. The effect produced upon the top cutting edge 18 is to give to it an obliquity with respect to the direction in which it moves in cutting, with the result that it will take a shearing cut.

In my hob the teeth are also undercut, by which I mean, as stated, that if a radial line be dropped from the top of the hob tooth at the forward edge, the front face of the tooth will slant backward from this line. This produces what is termed "hook" and promotes the ease with which the metal in the gear blank may be cut. This undercutting also results in an increase in the acuteness of the top cutting edge 18, as previously mentioned.

From the foregoing it will be evident that by running the gashes along a helix of the same hand lead as the thread helix the leading edge of the hob teeth has been made sharper, that is, rendered more acute, but at the expense of the leaving edge 17. To consider now the manner in which I have compensated for this reference should be had to the diagrams, particularly Figures 5 and 6. In the ordinary hob, whose action is illustrated in Figure 6, the leaving edge 17$^a$ removes a greater volume of metal from the gear blank than does the leading edge 16$^a$. Ordinarily the ratio is, roughly speaking, in the proportion of 30% to 20%, the remaining 50% being removed by the cutting edge 18$^a$ at the top of the tooth. This is roughly illustrated in Figure 6 where 21 represents the gear blank and 12$^a$ the tooth of an ordinary hob. The zone of action of the leading edge is represented by the area $a$, $b$, $c$ while the zone of action of the leaving edge 17$^a$ is represented by the area $d$, $e$, $f$. The zone of action of the cutting edge 18$^a$ at the top of the hob tooth is represented by the area $e$, $b$, $c$, $f$. It will be understood that the diagram is not offered as methematically accurate, but as illustrative, and it will also be understood that these proportions will vary slightly under different conditions, for example, the volumes removed by the different cutting edges will be different where the gear is designed on a 14½° pressure angle than where the gear is designed on a 20° pressure angle. The fact remains, however, that with the ordinary hob the leaving cutting edge is required to remove a considerable proportion of the total amount to be removed, and in a hub of my construction the amount required of the leaving edge is much reduced.

Referring now for comparison to the diagram of Figure 5 in which the principle of action of my hob is illustrated, the leading edge 16 removes metal from the zone A, B, C while the volume which must be removed by the leading edge 17 is represented by the area D, E, F. The volume removed by the top cutting edge 18 is represented by the area E, B, C, F. Roughly speaking, for hobs designed to produce involute gear teeth based on a 20° pressure angle the volume of metal removed by the leading edge of my hob will be ordinarily in the neighborhood of 25% of the whole, and of the top cutting edge about 60% of the whole, and of the leaving edge about 15%. As in the previous instance, however, these percentages are not offered as being accurate but rather as being illustrative, and the same is true of the diagram itself.

Figure 3:
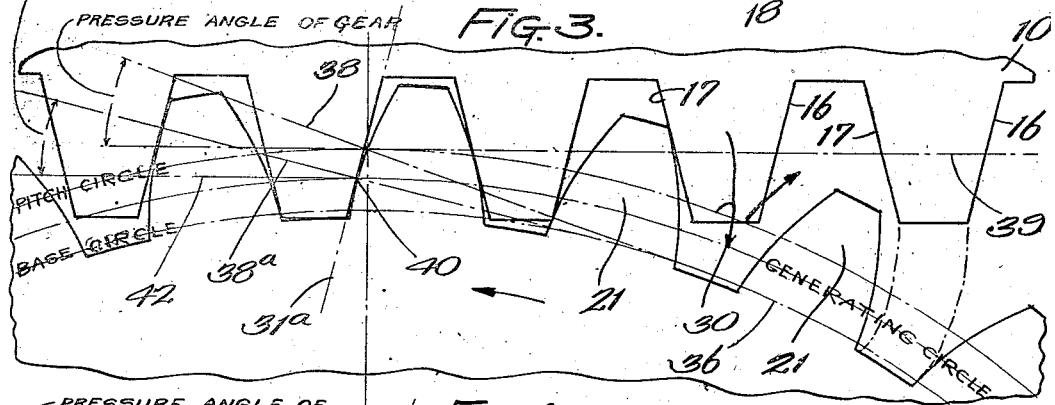
Figure 3 is a diagram on an increased scale showing an outline of the teeth of a gear and of the teeth of a hob embodying my invention.
Figure 4:
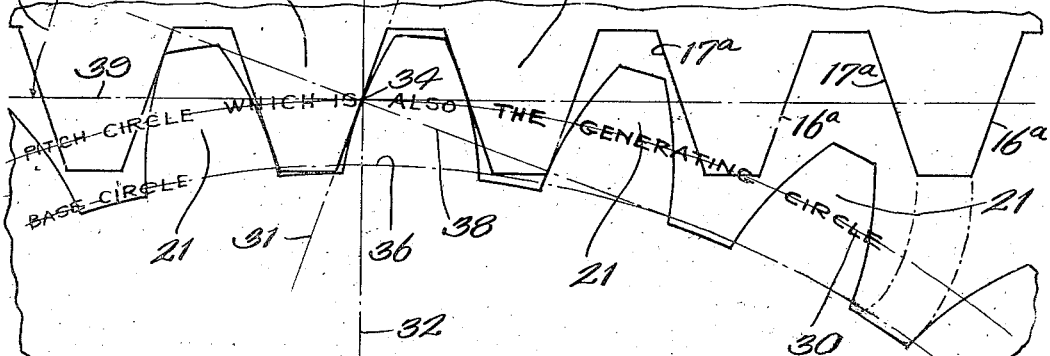
Figure 4 is a diagram analogous to Figure 3 showing the same gear teeth, but in cooperative relation with the teeth of an ordinary hob.

Now to explain the difference in the two hobs of Figures 5 and 6 more from the theoretical viewpoint, attention is directed to Figures 3 and 4, which are also diagrammatic and show respectively the new and the ordinary hob. In these two views the gear teeth 21 are identical. The pitch circle of the gear teeth is represented by the arc 30, and the pressure tangent by the line 31 which may be assumed to be at an angle of 20° from the radius 32 which passes through the pressure point 34, that is, the point where the pressure tangent intersects the pitch circle. The base circle 36 from which the gear tooth is generated is of course derived by erecting a perpendicular 38 to the pressure tangent 31 at the pitch point 34. Line 38 will be referred to as the pressure line and the angle between this and the pitch line tangent 39 of the gear will, of course, represent the pressure angle. In the ordinary hob, which Figure 4 represents, the side of the adjacent hob tooth is made to conform (allowance being made for clearance of course) to the pressure tangent 31. Thus the hob teeth will have the same pressure angle as the teeth of the gear to be cut.

Now referring for comparison to Figure 3, which is a diagram illustrating the action of my improved hob, the gear teeth 21 are the same as in Figure 4, and the same is true of the pitch circle 30, pressure line 38 of the gear teeth and gear tooth tangent 39. But for my hob I make the side of the hob tooth conform to a pressure tangent $31^a$ which is tangent to the side of the gear tooth at a point 40 lower down on the gear tooth. Thus it will be evident that the teeth of my new hob will have sides which are more nearly perpendicular to the hob axis, and are thinner at the base and thicker at the top than the teeth of the ordinary hob shown in Figure 4. A perpendicular $38^a$ erected upon a line $31^a$ at the point 40 will lie more nearly parallel with the pitch line 42 of the hob than will line 38 relatively to the pitch line tangent 39 of the gear. Thus in my hob the pressure angle is smaller and the pitch line 42 of the hob is not coincident with the pitch line tangent 39 of the gear. Incidentally it may be stated that in my hob the lead is somewhat shorter than in the ordinary hob.

The hob shown in Figure 8 is made in accordance with the principles above described, but has a double thread, that is, having two starts of thread, which is found to be desirable, especially in connection with roughing hobs.

From the foregoing it will be seen that my hob in its preferred form has two cutting edges which are definitely acute, but that while this acuteness is obtained at the expense of the third cutting edge, which becomes obtuse, this objection is more than offset by the improved action of the other two cutting edges and the fact that the teeth are modified in such a way as to require the acute cutting edges to remove the greater bulk of the material and assume a considerable amount of the burden usually carried by the leaving side, which is now rendered obtuse. The efficiency is also enhanced by the fact that the acute cutting edges take a shearing cut. I have found by test that production in cutting gears with these hobs has been raised about 50% over the production obtained when ordinary hobs are used. The improvement becomes very important when cutting gear teeth of large pitches where the bulk of the material is removed by a roughing operation, for which this hob is far superior to the ordinary roughing hob.

Having thus described my invention what I claim as new and desire to secure by Letters Patent is:

1. A hob for producing ordinary involute tooth gears, said hob having gashes oblique to the thread of the hob in a direction to increase considerably the sharpness of the cutting edge at the leading side of the hob teeth, the hob teeth having sides steeper than the teeth of hobs whose axial pitch is equal to the circular pitch of the gear to be cut.

2. A hob having spiral gashes oblique to the thread of the hob and of the same hand lead as the thread of the hob thereby increasing the sharpness of the cutting edge at the leading side of the hob teeth, the hob teeth having sides steeper than the teeth of hobs whose axial pitch is equal to the circular pitch of the gear to be cut.

3. A hob for cutting ordinary involute tooth gears, said hob having gashes oblique to the thread of the hob and extending in a direction to increase the sharpness of the cutting edge of the leading side of the hob teeth, the hob teeth having steeply sloping sides to thereby generate on a circle of smaller diameter than the pitch circle of the gear to be cut, the hob teeth being undercut to thereby produce an acute cutting angle at the top cutting edge of the hob teeth.

4. A hob for cutting involute tooth gears, said hob having a lead shorter than that required to make the normal pitch of the hob equal to the circular pitch of the gear to be cut, the hob having gashes traversing the thread of the hob obliquely in a direction to increase the sharpness of the cutting edge of the leading side of the hob teeth and to make the top cutting edge of the teeth oblique to the direction of movement of the teeth to thereby produce a shearing cut, the hob teeth being undercut to thereby produce an acute cutting edge at the top of the hob teeth.

5. A hob for cutting involute tooth gears, said hob having a lead which will produce a shorter normal spacing of the threads of the hob than the circular pitch of the gears to be cut, all of the teeth having the same configuration and both sides of the teeth having the same degree of slope, the hob having gashes traversing the thread of the hob obliquely in a direction to increase the sharpness of the cutting edge of the leading side of the hob teeth and to make the top cutting edge of the teeth oblique to the direction of movement of the teeth.

6. A hob for cutting involute gears, the sides of the hob teeth having a slope of such steepness as to cause them to generate on a circle of smaller diameter than the diametrical pitch circle of the gear to be cut.

7. A spiral gash hob in which the gashes while approximately transverse to the thread are helical and of the same hand as the thread, and the teeth have a pressure angle less than the pressure angle of the teeth in the gear to be cut.

8. A hob having teeth with an acute cutting edge and an obtuse leaving cutting edge, the teeth having straight sides when viewed in profile upon a plane passing approximately diametrically through the hob, the teeth being narrower at the bottom and wider at the top than in a hob in which the sides of the teeth conform to the pressure angle of the teeth of the gear to be cut.

9. A hob having approximately spiral gashes of the same hand lead as the thread of the hob, the teeth having straight sides when viewed in profile upon a plane passing approximately diametrically through the hob, the teeth being narrower at the bottom and wider at the top than in a hob in which the sides of the teeth conform to the pressure angle of the teeth of the gear to be cut, the hob teeth being undercut to thereby produce an acute angle at the top cutting edge of the hob teeth.

10. A hob having a helicoidal thread serrated to make teeth of standard contour and of standard pitch, helicoidal flutes in the same helicoidal direction but of a longer lead than the thread; the angle of the flutes to the plane of rotation being about 85°.

11. In a hob for generating involute gear teeth and the like having a helicoidal thread having an axial pitch which is smaller than the circular pitch of the gear to be cut, the rolling pitch line of the hob being tangent to a generating circle located inside of the pitch circle of the gear to be cut.

12. A hob for generating involute gear teeth and the like having a helicoidal thread which has an axial pitch corresponding to a distance measured along a circle which is of less diameter than the pitch circle of the gear to be cut, said distance being taken between a pair of imaginary radial lines of the gear which intersect said first mentioned circle, said imaginary lines passing through the pitch circle of the gear at points, the distance between which is equal to the circular pitch of the gear.

In witness whereof, I have hereunto subscribed my name.

CARL G. OLSON.